June 10, 1969  A. C. BALK  3,449,184
METHOD OF MAKING LAMINATED GLASS PRODUCTS
Filed Oct. 22, 1965
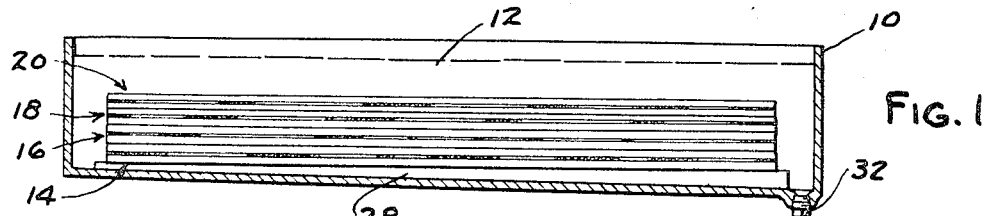
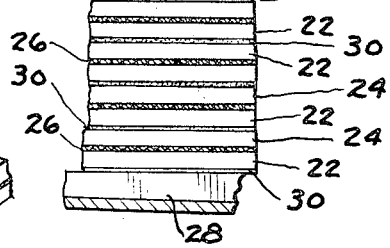
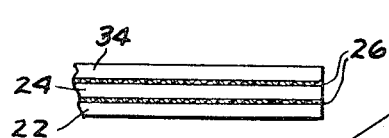
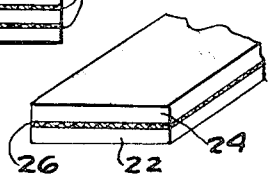
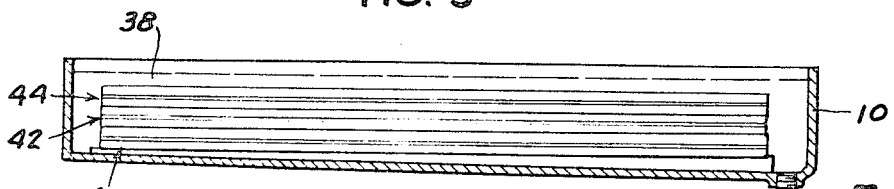
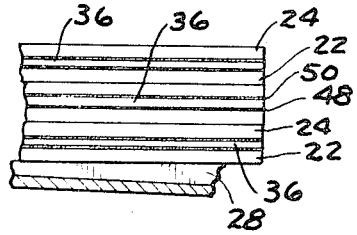
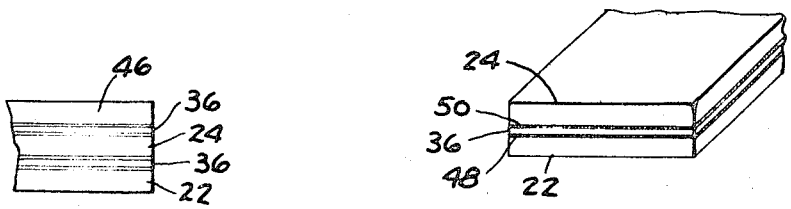
INVENTOR.
ALBERT C. BALK
BY
Barnes, Kisselle, Raisch & Choate
ATTORNEYS 3,449,184
METHOD OF MAKING LAMINATED GLASS PRODUCTS
Albert C. Balk, 16861 Avon Road,
Detroit, Mich. 48219
Filed Oct. 22, 1965, Ser. No. 500,930
Int. Cl. C03c 27/04; B32b 31/04, 7/12
U.S. Cl. 156—105                    20 Claims

ABSTRACT OF THE DISCLOSURE

A laminated glass product is made by immersing two sheets of glass and an interlayer of another material in a bath of liquid resin. The glass sheets are sandwiched against opposite faces of the interlayer, thereby trapping a small quantity of the resin therebetween. The resin is of a type which will cause the formation of a bond between the glass sheets and interlayer at room temperature or slightly elevated temperatures and without producing any substantial volatile products. The sandwich is removed from inundation in the bath and the trapped resin is allowed to cure at room temperature or a slightly elevated temperature.

---

This invention relates generally to the manufacture of products by laminating sheets of glass together, usually with the inclusion of a layer of material between the glass sheets for various decorative or functional purposes.

It is conventional in the manufacture of safety glass to sandwich between two sheets of glass a layer of plastic material which, when in intimate contact with the glass surfaces, will bond therewith. To obtain the requisite intimate contact, the glass sheets in heated condition and plastic interlayer are passed between rubber pinch rolls at about 40 p.s.i. to exclude air from between the sheets and to obtain an initial bonding. The laminated sheets are then placed in an autoclave where they are further heated to about 275° F. at about 30 p.s.i. pressure for some 20 to 30 minutes. This step completes a satisfactory bond between the plastic and glass sheets for commercial safety glass purposes. The equipment required to make laminated glass in this manner is large and very expensive and can only be economically operated in the production of large quantities of the laminated glass product.

One object of the present invention is to provide a very simple method of making laminated glass products which can be easily practiced by an individual utilizing very inexpensive equipment. A further object of the invention is to provide such a process improved so that a large variety of types of both functional and decorative layers can be laminated between the glass sheets.

Generally, the invention contemplates total immersion of the glass sheets and interlayer within a bath of organic plastic material in liquid state, and bringing the glass and interlayer into laminar relation within the bath so that small quantities of the liquid are trapped between the lamina. The trapped material, being liquid, is in intimate contact with the lamina. The excess liquid is then drained away from the lamina. That part of the liquid which is between the lamina then either absorbs into the interlayer or polymerizes to solid state, depending upon the materials used, and the lamina are thereby bonded together to provide the laminated glass product. In the accompanying drawings:

FIG. 1 is a diagrammatic sectional view of a tank containing a number of laminated glass products in the course of manufacture in accordance with the present invention.

FIG. 2 is an enlarged, fragmentary, diagrammatic view illustrating the relation of the products shown in FIG. 1.

FIG. 3 is a fragmentary, diagrammatic view of a typical product made by the method illustrated in FIG. 1.

FIG. 4 is a diagrammatic end view illustrating a modified form of products which can be made by the process of FIG. 1.

FIG. 5 is a view similar to FIG. 1 illustrating a modified process in practice of the invention.

FIG. 6 is an enlarged fragmentary, diagrammatic view illustrating the relation between the products shown in FIG. 5.

FIG. 7 is a fragmentary, diagrammatic, perspective view illustrating a typical product made by the process illustrated in FIG. 5.

FIG. 8 is a fragmentary, diagrammatic end view of a modified form of product which can be made by the process illustrated in FIG. 5.

Shown in FIG. 1 is a tank 10 containing a bath 12 of an organic plastic material. Immersed in the bath are four laminated glass products 14, 16, 18, 20 in the course of manufacture in accordance with the process of the present invention. Each of these products is illustrated as being comprised of two sheets of glass 22, 24 and a layer of functional or decorative material 26 laminated therebetween. The bottom product 14 is supported by the bottom 28 of tank 10 while products 16–20 are in stacked relation thereon.

In general, the glass sheets and interlayers 26 are immersed in bath 12 in such a way as to trap small quantities of liquid forming the bath between the glass sheets and interlayer of each product. Between adjacent layers in the stack are layers 30 of a barrier material which excludes the bath liquid from penetration between the adjacent products. A layer 30 of the barrier material is also disposed between bottom sheet 22 in the stack and bottom 28 of the tank. When the products have been thus immersed in the tank, liquid bath 12 is either pumped out of tank 10 or is drained from tank 10 by removing a drain plug 32.

After the liquid trapped between the several sheets 22, 24 has cured, the glass sheets and interlayer 26 of each product are adhered together while the adjacent products are prevented from adhering to one another by barrier material 30. The resulting products may then be separated from each other and the bottom one seperated from tank bottom 28 to provide a plurality of products (FIG. 3) which may be any one of products 14–20 within the tank. As will become more readily apparent below, the product need not be limited to two sheets of glass and an interlayer but could be formed of three or more sheets of glass 22, 24, 34 and a plurality of interlayers 26, as illustrated in FIG. 4.

More specifically, in the FIG. 1 form of the process, liquid bath 12 comprises a resin which will polymerize without producing volatile products and which in polymerized form has good adhesion to glass and interlayer 26. General examples of suitable resin materials are epoxides, polyesters, vinyl monomers, and mixtures of the three. Two specific examples of suitable resin materials are:

(1) Diallyl phthalate monomer containing 1%–5% benzoyl peroxide dissolved therein; and (2) A mixture containing in relative proportion:

|  | Parts |
|---|---|
| Vinyl cyclohexene dioxide | 20 |
| Maleic anhydride | 10 |
| Tetrapropylene glycol | 5 |

The ingredients of the latter mixture are dissolved to form the resin. If the latter resin is to be cured at room temperature, an acidic catalyst such as zinc chloride is added in the relative proportion of .1 part so that a satisfactory cure is obtained within 48–60 hours. This catalyst is not required if the curing is accelerated by heating the product in the process of manufacture to about 60° C., for example, in a warming chamber or under a heating mantle.

In general, suitable materials for barrier layers 30 are viscous oils, gels, or pastes which do not flow readily, which are non-polymerizing, and which are insoluble in and not readily miscible with the resin-forming bath 12. More specifically, suitable materials comprise petrolatum, soap paste, and ethylene glycols or polyethylene glycols thickened with silica, clays, soaps, or other gelling agents. A specific suitable barrier material comprises 95 parts diethylene glycol containing 5 parts amorphous, finely divided silica as a gelling agent.

Interlayer 26 can be formed of a wide range of materials such as paper and cloth fabrics, metal foils, monofilaments, metallic flakes, and particulate materials.

A specific example of a combination of materials suitable for use in practicing the invention is one in which bath 12 comprises diallyl phthalate monomer containing 3% benzoyl peroxide dissolved therein, barrier material 30 comprises the specific example last mentioned above, and interlayer 26 comprises a layer of woven cloth fabric.

To make one or more products, one face of the lower glass sheet 22 to form product 14 is provided with a layer of the barrier material 30 and the coated sheet is then immersed in bath 12 until its coated face rests against tank bottom 28. Interlayer 26 is then immersed in the bath and is brought into laminar relation over the upper face of glass sheet 22. If only the one product 14 is to be made at one time, upper glass sheet 24 is then immersed in the bath and then moved into laminar relation over interlayer 26.

However, if a number of products are to be made at one time, upper sheet 24 of product 14 and lower sheet 22 of the next-higher product in the stack are sandwiched with an interposed layer 30 of the barrier material. This causes these two sheets of glass to adhere together so that they can be handled conveniently as a unit. The two sheets and interposed barrier material are immersed in bath 12 and moved toward the bottom of the tank until glass sheet 24 of product 14 is brought into laminar relation over interlayer 26 thereof. Then the process is repeated to complete the lamination of however many products are to be formed in the tank at one time.

A small quantity of the liquid resin is trapped between glass sheets 22, 24 of each product 14–20 during the laminating process. The trapped resin may penetrate through a porous interlayer 26; or if the interlayer is imperforate metal foil, for example, the trapped resin will be in the form of two films, one between the interlayer and each sheet of glass. In either event, the trapped liquid resin is in intimate contact with both glass sheets 22, 24 and interlayers 26. The trapped resin excludes air or other gases or foreign matter which might otherwise interfere with formation of a bond between the polymerized resin and the glass and interlayer.

After the desired number of laminated products have been formed in bath 12, the products are removed from inundation in the bath, and this is conveniently done by pumping the liquid resin out of tank 12 or by draining the tank, as by removing drain plug 32. The laminated products are maintained in their laminated condition until the trapped resin in each polymerizes. This is conveniently done by merely allowing the laminated products to remain undisturbed. In practice, it is sometimes desirable to apply additional weight to the top of the laminated products. This can be done either before or after draining bath 12 by any suitable means such as placing lead weights or additional glass sheets on top of the products. Such weight encourages better contact between the lamina and tends to prevent them from shifting laterally out of alignment.

During the process of polymerization, the trapped resin material remains in intimate contact with the glass sheets and interlayer so that when curing or polymerization is complete, the cured resin is tightly bonded to the glass and interlayer which are thereby tightly adhered together. Polymerization occurs in the specific example given above at room temperature in about 48–60 hours.

After the trapped resin material has cured, adjacent products 14–20 within tank 10 are separated from each other as by inserting a spatula blade between the glass sheets temporarily adhered together by barrier layer 30. Similarly, product 14 is separated from the tank bottom by means of a spatula blade inserted under it. The products may then be washed off and are complete.

The process involved in FIGS. 5–8 is carried out in a manner generally similar to that described above except that the interlayer 36 in this case is formed of an organic plastic film and bath 38 within tank 10 comprises a plasticizer for the film. One or more laminated products 40, 42, and 44 are built up within bath 38 by successively immersing glass sheet 22, interlayer 36, and glass sheet 24 of each in the bath and bringing them into laminar relation. The products are stacked one on the other as in the method described above; but in this case, where a plurality of products are formed, no layer of barrier material is required between sheets 24, 22 of adjacent products nor between sheet 24 of product 40 and the bottom of the tank. The reason for this is that the liquid plasticizer material does not of itself form a bond with glass.

When the product or products have been formed within the bath, a small quantity of the plasticizer is trapped between interlayer 36 and the adjacent glass sheets of each product. Thereafter, tank 10 is drained as before. The trapped liquid plasticizer is in intimate contact with the inward surfaces of the glass sheets, and it excludes from between the lamina air and other gases and foreign matter which might prevent the formation of a tight bond between the glass sheets and interlayer.

The liquid plasticizer absorbs into the plastic material forming interlayer 26 and during the process of absorption remains in intimate contact with the glass. This process results in the formation, when the plasticizer is completely absorbed, of a tight bond between plastic interlayer 36 and the adjacent sheets of glass. The absorption process requires anywhere from about one-half hour to several hours at room temperature for completion but may be accelerated by subjecting products being cured to heat, for example, at about 60° C. When the absorption is complete, products 40–44 may be lifted out of tank 10 one at a time and the process may then be repeated.

As in the first-described example, products according to this modification may comprise two sheets of glass and a single interlayer (FIG. 7) or may comprise more than two layers of glass 22, 24, 46 and a plurality of interlayers 36 (FIG. 8).

General examples of plastic materials suitable for use in forming interlayers 36 are thermoplastic films such as plasticized polyvinyl chloride, plasticized polyvinyl butyral, and plasticized ethyl cellulose. Thermosetting films can also be used; for example, rubber elastomers and silicone elastomers compounded with cross linking or vulcanizing materials. If polyvinyl butyral or ethyl cellulose is used, the plasticizer, for example, could comprise triethylene glycol di 2 ethyl butyrate, dibutyl sebacate, hexadecyl alcohol; whereas if a silicone elastomer is used, the plasticizer could comprise a silicone prepolymer such as methyl silicone oil containing a curing agent such as benzoyl peroxide.

Some useful thermoplastic films such as a plasticized polyvinyl chloride do not of themselves adhere satisfactorily to glass. In such cases, excellent adhesion of the interlayer to the glass sheets is achieved either by incorporating into the plasticizer a small quantity of silane monomer such as gamma amino propyl triethoxy silane or by precoating the glass with certain lacquers such as those made from a maleic anhydride modified polyvinyl chloride resin or a polyester resin. The second method is the more useful where, for example, some delicate coating on the glass sheets requires protection in the course of handling the sheets prior to their becoming laminated in the resin bath. Examples of the coatings which may require such protection are the ornamental and partial mirroring coatings discussed below.

As a specific example of a combination of materials suitable for practicing this form of the invention, plastic film 36 is made of plasticized polyvinyl butyral containing plasticizer in the range from about 15 parts per hundred to about 50 parts per hundred, the plasticizer consisting of triethylene glycol di 2 ethyl butyrate. As another specific example, plastic film 36 is made of plasticized ethyl cellulose containing plasticizer in the range from about 10 parts per hundred to about equal parts ethyl cellulose and plasticizer, the plasticizer consisting of triethylene glycol di 2 ethyl butyrate.

From the above description, it will be seen that liquid resin 10 and liquid plasticizer 38 can be termed bonding agents, since in each case they are effective to cause a bond to form between the glass sheets and interlayer.

In general, either modification of the invention described herein can be used to manufacture a wide variety of products wherein the glass is strengthened, ornamented, or given some other desired physical property. For an example of both ornamentation and strengthening, decorative films 48, 50 may be combined with plastic layer 36 between the glass sheets to provide an ornamented safety glass product (FIGS. 6 and 7). This can be done by applying paint to either the inner sides of the glass sheets or the outer surfaces of the plastic interlayer. The paint vehicle composition would be the same, in general, as that of the composition forming interlayer 36.

Another example is a product in which heat-reflective, transparent glass is made by depositing a very thin layer of silver on one face of either glass sheet 22 or 24 by a conventional partial mirroring process. The two sheets can then be adhered together to contain the partial mirroring by either modification described above.

As will be apparent, a number of different kinds of products can be made in a single batch utilizing either modification of the process described above.

I claim:
1. The process of making a laminated glass product which comprises:
 providing first and second sheets of glass,
 providing a layer of material other than glass,
 providing a bath of liquid bonding agent which is capable when introduced between glass and said other material to cause the formation of bonding by which glass and said other material are adhered together, said liquid being so capable in a temperature range from room temperature to slightly elevated temperatures, and substantially without producing volatile products in said temperature range,
 inundating said first sheet of glass and said layer of other material in laminar relation in said bath,
 while said first sheet and layer are so inundated, placing said second sheet in laminar relation over said layer and thereby trapping a small quantity of said bonding agent between said sheets,
 removing said sheets and layer so laminated from inundation in said bath,
 and maintaining said sheets and layer in laminated condition and in said temperature range until the formation of said bonding is complete.

2. The process defined in claim 1 wherein said bath is provided in the form of a substantially quiescent pool, said inundation being effected by immersing said first sheet and the layer in said pool, said second sheet being placed in laminar relation over said layer while said sheets and layer are immersed in said pool.

3. The process defined in claim 2 wherein said first sheet is first totally immersed in said pool, said layer of material is then totally immersed in said pool and moved through said pool into laminar relation with said first sheet, and said second sheet is then immersed in said pool and moved through said pool into laminar relation with said layer.

4. The process defined in claim 1 wherein said bonding agent comprises a resin material which will polymerize and which when polymerized will bond to glass and said other material, said bonding being formed as an incident of polymerization of said trapped resin.

5. The process defined in claim 4 wherein said resin material is selected from the group of materials consisting of epoxides, polyesters, vinyl monomers, and mixtures thereof.

6. The process defined in claim 5 wherein said resin material is composed of the following constituents in the following relative proportions: vinyl cyclohexene dioxide, 20 parts; maleic anhydride, 10 parts; and tetrapropylene glycol, 5 parts.

7. The process defined in claim 6 wherein said resin includes in addition an acidic catalyst such as zinc chloride in a relative proportion of about .1 part.

8. The process defined in claim 5 wherein said resin material consists of diallyl phthalate monomer containing about 1% to about 5% benzoyl peroxide dissolved therein.

9. The process defined in claim 1 wherein said other material is an organic plastic material which bonds to glass with which it is in intimate contact, and said bonding agent is a plasticizer for said plastic material, said bonding being formed as an incident of absorption of said trapped plasticizer into said plastic material.

10. The process defined in claim 9 wherein said layer of other material comprises a film of plasticized thermoplastic material.

11. The method defined in claim 10 wherein said other material comprises polyvinyl butyral containing plasticizer in the range from about 15 to about 50 parts per hundred.

12. The method defined in claim 11 wherein said bonding agent is selected from the group consisting of triethylene glycol di 2 ethyl butyrate, dibutyl sebacate, and hexadecyl alcohol.

13. The method defined in claim 10 wherein said other material comprises ethyl cellulose containing plasticizer in the range from about 10 parts per hundred to about equal parts ethyl cellulose and plasticizer.

14. The method defined in claim 13 wherein said bonding agent is selected from the group consisting of triethylene glycol di 2 ethyl butyrate, dibutyl sebacate, hexadecyl alcohol, and castor oil.

15. The process of making a laminated glass product which comprises:
 providing first and second sheets of glass,
 providing a layer of an organic plastic material which when in intimate contact with glass will bond thereto,
 providing a bath of liquid-state plasticizer for said organic material which, of itself, will not bond to glass, and which, in a temperature range from room temperature to slightly elevated temperatures, produces substantially no volatile products,
 immersing said first sheet of glass in said bath,
 immersing said layer of material in said bath and advancing it into laminar relation over said first sheet of glass and thereby trapping a small quantity of said plasticizer between said layer and first sheet,
 immersing said second sheet of glass in said bath and advancing it into laminar relation over said layer of material and thereby trapping a small quantity of said plasticizer between said layer and second sheet,
 removing said sheets and layer so laminated from immersion in said bath,
 maintaining said sheets and layer in laminated condition and in said temperature range until said trapped plasticizer becomes absorbed into said layer and thereby causing bonds to be formed by which said sheets of glass and layer are adhered together.

16. The process defined in claim 15 wherein said sheets and layer are disposed vertically one on top of another while immersed in said bath.

17. The process defined in claim 15 and including in addition the steps of immersing a third layer of glass in said bath and moving it into laminar relation over said second sheet,
repeating the immersion and laminating steps over said third sheet of glass with a second layer of said material and a fourth sheet of glass,
and finally, after the formation of said bonds, separating said second and third sheets of glass to provide a plurality of laminated glass products.

18. The process of making a laminated glass product which comprises:
providing first and second sheets of glass,
providing a layer of material other than glass,
providing a bath of a resin material which, in a temperature range from room temperature to slightly elevated temperatures, will polymerize substantially without producing volatile products and which, when polymerized, will bond to glass and said other material,
immersing said first sheet of glass in said bath,
immersing said layer of material in said bath and moving it into laminar relation over said first sheet of glass and thereby trapping a small quantity of said resin material between said layer and first sheet of glass,
immersing said second sheet of glass in said bath and moving it into laminar relation over said layer of other material and thereby trapping a small quantity of said resin material between said second sheet of glass and layer,
removing said sheets and layers so laminated from immersion in said bath,
maintaining said sheets and layer in laminated condition and in said temperature range until said resin polymerizes, and thereby bonding said layer and sheets of glass together to form said laminated glass product.

19. The process defined in claim 18 wherein said layer and sheets of glass are disposed vertically one on top of another when they are immersed in said bath.

20. The process defined in claim 19 and including the additional steps of temporarily adhering a third sheet of glass to said second sheet of glass before immersion thereof in said bath by means of a non-polymerizing barrier material which is substantially insoluble in and not readily miscible with said resin,
immersing said second and third sheets thus adhered together in said bath, and moving said second sheet into laminar relation over said layer as described,
by means of said barrier material, excluding said resin from penetration between said second and third sheets of glass,
then repeating said immersion and lamination steps over said third sheet of glass utilizing another layer of said material and a fourth sheet of glass,
and finally, after said trapped resin has polymerized, separating said second and third sheets of glass to provide a plurality of laminated glass products.

References Cited

UNITED STATES PATENTS

| | | | |
|---|---|---|---|
| 1,921,612 | 8/1933 | Fraser et al. | 156—101 |
| 2,946,711 | 7/1960 | Bragaw et al. | 156—106 |

FOREIGN PATENTS

| | | |
|---|---|---|
| 355,604 | 8/1931 | Great Britain. |
| 800,669 | 8/1958 | Great Britain. |

ROBERT F. BURNETT, *Primary Examiner.*

WILLIAM J. VAN BALEN, *Assistant Examiner.*

U.S. Cl. X.R.

156—99, 106, 285, 288, 289, 305, 310